(12) United States Patent
Jiang et al.

(10) Patent No.: US 10,503,807 B2
(45) Date of Patent: Dec. 10, 2019

(54) METHOD AND APPARATUS FOR MEASURING TIME STAMP UNIT OF REMOTE DEVICE

(71) Applicant: HUAWEI TECHNOLOGIES CO., LTD., Shenzhen (CN)

(72) Inventors: Hua Jiang, Plano, TX (US); Shengjin Wu, Shenzhen (CN); Debu Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 15/865,270

(22) Filed: Jan. 9, 2018

(65) Prior Publication Data

US 2018/0150432 A1    May 31, 2018

Related U.S. Application Data

(63) Continuation of application No. PCT/CN2016/094369, filed on Aug. 10, 2016.

(30) Foreign Application Priority Data

Aug. 31, 2015  (CN) .......................... 2015 1 0545626

(51) Int. Cl.
*G06F 17/18* (2006.01)
*H04L 12/26* (2006.01)
(Continued)

(52) U.S. Cl.
CPC ............ *G06F 17/18* (2013.01); *H04L 43/022* (2013.01); *H04L 43/067* (2013.01);
(Continued)

(58) Field of Classification Search
CPC ....... G06F 17/18; H04L 43/106; H04L 43/16; H04L 43/067; H04N 21/8547; H04N 21/4305
See application file for complete search history.

(56) References Cited

U.S. PATENT DOCUMENTS 7,333,517 B2 * 2/2008 Madhavapeddi ... H04L 12/2854
370/509
8,060,054 B1 * 11/2011 Dinan ............... H04W 52/0216
455/343.4
(Continued)

FOREIGN PATENT DOCUMENTS

CN    1716907 A    1/2006
CN   101026509 A    8/2007
(Continued)

OTHER PUBLICATIONS

Yang Yuan-Hua et al, State Estimation Subject to Random Communication Delays, Acta Automatica Sinica, vol. 39, No. 3 Mar. 2013, 7 pages.

*Primary Examiner* — Christine Ng
(74) *Attorney, Agent, or Firm* — Kilpatrick Townsend & Stockton LLP (57) ABSTRACT

The method for measuring a time stamp unit of a remote device includes: obtaining m sets of sampled data, m is a positive integer, and m>1; calculating m estimated time stamp units according to the time stamps when packets are transmitted and the time points when the previously transmitted data packets and the subsequently transmitted data packets arrive at the measuring point; selecting, from the m estimated time stamp units, an estimated time stamp unit; and calculating a time stamp unit of the remote device according to the selected estimated time stamp unit.

20 Claims, 2 Drawing Sheets

(51) Int. Cl.
  *H04N 21/43* (2011.01)
  *H04N 21/8547* (2011.01)
  *G06F 1/04* (2006.01)
  *H04L 29/06* (2006.01)
(52) U.S. Cl.
  CPC ............ *H04L 43/106* (2013.01); *H04L 43/16* (2013.01); *H04N 21/4305* (2013.01); *H04N 21/8547* (2013.01); *G06F 1/04* (2013.01); *H04L 69/16* (2013.01)

(56) References Cited

U.S. PATENT DOCUMENTS

| | | | | |
|---|---|---|---|---|
| 8,867,350 | B2* | 10/2014 | Dawson | H04L 43/08 370/230.1 |
| 9,106,787 | B1* | 8/2015 | Holmer | H04L 43/087 |
| 9,634,745 | B2* | 4/2017 | Patwardhan | H04B 7/0452 |
| 2002/0174216 | A1* | 11/2002 | Shorey | H04L 43/00 709/224 |
| 2004/0122969 | A1* | 6/2004 | Ameigeiras | H04L 1/1854 709/235 |
| 2005/0286424 | A1 | 12/2005 | Peeters et al. | |
| 2007/0091894 | A1* | 4/2007 | Kang | H04L 1/1664 370/394 |
| 2009/0103609 | A1 | 4/2009 | Jiang et al. | |
| 2009/0245291 | A1 | 10/2009 | Wolfe et al. | |
| 2011/0286442 | A1* | 11/2011 | Maurice | H04W 56/0015 370/350 |
| 2014/0160945 | A1* | 6/2014 | Robitaille | H04L 43/0894 370/252 |

FOREIGN PATENT DOCUMENTS

| | | |
|---|---|---|
| CN | 101114982 A | 1/2008 |
| CN | 101370175 A | 2/2009 |
| CN | 101674204 A | 3/2010 |
| EP | 0983658 B1 | 3/2007 |
| EP | 1936867 A1 | 6/2008 |

* cited by examiner

METHOD AND APPARATUS FOR MEASURING TIME STAMP UNIT OF REMOTE DEVICE

CROSS-REFERENCE TO RELATED APPLICATIONS

This application is a continuation of International Application No. PCT/CN2016/094369, filed on Aug. 10, 2016, which claims priority to Chinese Patent Application No. 201510545626.5, filed on Aug. 31, 2015. The disclosures of the aforementioned applications are hereby incorporated by reference in their entireties.

TECHNICAL FIELD

Embodiments of the present invention relate to the computer field, and more specifically, to a method and an apparatus for measuring a time stamp unit of a remote device.

BACKGROUND

There is a time stamp option in Transmission Control Protocol (TCP). When a TCP flow supports this option, a data packet header includes a record of a data packet transmission time. An implementation method is to place a tick count of a current system clock in a time stamp field when a sending party sends a packet segment. When confirming the packet segment, a receiving party copies a value of the time stamp field to a time stamp echo acknowledgement field. A time stamp (in ticks) is a value that increases monotonically. In a general TCP application, a receiving party only needs to echo back a received time stamp, but does not need to pay attention to a time stamp unit of a peer party, and does not require clock synchronization between the two connected parties, either. System clock frequencies used in operating systems and computers are mutually different. Therefore, time units of a tick count in different servers are also different, and may range from 0.5 millisecond to 1000 milliseconds.

A time stamp in the TCP protocol is just a tick count rather than an absolute time. Therefore, currently, the time stamp can be used locally only, and cannot be used by any remote device on a network.

A prior-art method for measuring a time stamp unit of a remote device is based on time synchronization between a remote end and a local end. In the method, a time stamp unit may be estimated, minus an error caused by a transmission delay, according to comparison between a packet receiving time and a packet header time stamp. In this method, time synchronization on a network is required, and a measurement error caused by the transmission delay cannot be effectively eliminated, resulting in inaccurate measurement.

SUMMARY

Embodiments of the present invention provide a method and an apparatus for measuring a time stamp unit of a remote device, to obtain a relatively accurate time stamp unit without requiring network-wide clock synchronization.

According to a first aspect, a method for measuring a time stamp unit of a remote device is provided, where the method includes:

obtaining m sets of sampled data, where each set of sampled data includes time stamps when packets are transmitted and time points when the packets arrive at a monitoring point that are of a previously transmitted data packet and a subsequently transmitted data packet of a remote device, m is a positive integer, and m>1; calculating m estimated time stamp units according to the time stamps when packets are transmitted and the times of arrival at the monitoring point that are of the previously transmitted data packets and the subsequently transmitted data packets of the remote device and that are in the m sets of sampled data; selecting, from the m estimated time stamp units, an estimated time stamp unit, a difference between which and an average value of the m estimated time stamp units falls within a predetermined range; and calculating a time stamp unit of the remote device according to the selected estimated time stamp unit.

With reference to the first aspect, in a first possible implementation manner, a specific implementation of the calculating m estimated time stamp units according to the time stamps when packets are transmitted and the times of arrival at the monitoring point that are of the previously transmitted data packets and the subsequently transmitted data packets of the remote device and that are in the m sets of sampled data is: determining the m estimated time stamp units according to the following formula:

$$U_i=(S2_i-S1_i)/(t2_i-t1_i),$$

where $S1_i$ represents a packet transmission time stamp of a previously transmitted data packet of the remote device in an $i^{th}$ set of sampled data, $S2_i$ represents a packet transmission time stamp of a subsequently transmitted data packet of the remote device in the $i^{th}$ set of sampled data, $t1_i$ represents a time of arrival at the monitoring point of the previously transmitted data packet of the remote device in the $i^{th}$ set of sampled data, $t2_i$ represents a time of arrival at the monitoring point of the subsequently transmitted data packet of the remote device in the $i^{th}$ set of sampled data, and $U_i$ represents an estimated time stamp unit calculated according to the $i^{th}$ set of sampled data.

With reference to the first aspect or the first possible implementation manner of the first aspect, in a second possible implementation manner a specific implementation of the calculating a time stamp unit of the remote device according to the selected estimated time stamp unit is: determining the time stamp unit of the remote device according to the following formula:

$$U=\text{int}(1/q(\Sigma U_i)),$$

where $\Sigma U_i$ represents a sum of the selected estimated time stamp unit, q represents a quantity of the selected estimated time stamp unit, and a function int represents rounding down.

With reference to the first aspect or the first possible implementation manner of the first aspect or the second possible implementation manner of the first aspect, in a third possible implementation manner, a specific implementation of the selecting, from the m estimated time stamp units, an estimated time stamp unit, a difference between which and an average value of the m estimated time stamp units falls within a predetermined range is: selecting, from the m estimated time stamp units, an estimated time stamp unit, a difference between which and the average value of the m estimated time stamp units is less than three times of a sample standard deviation of the m estimated time stamp units.

With reference to any one of the first aspect or the first possible implementation manner of the first aspect to the third possible implementation manner of the first aspect, in a fourth possible implementation manner, a specific implementation is as follows: packet lengths of any two data packets in the m sets of sampled data are equal, and packet transmission intervals of any two sets of sampled data in the m sets of sampled data are equal.

With reference to the fourth possible implementation manner of the first aspect, in a fifth possible implementation manner, a specific implementation is as follows: the packet transmission interval meets the following criteria:

$$D > 10L/B,$$

where D represents an actual time span of the packet transmission interval, L represents the packet length, and B represents a network bottleneck bandwidth between the remote device and a local device.

With reference to the fourth possible implementation manner of the first aspect or the fifth possible implementation manner of the first aspect, in a sixth possible implementation manner, a specific implementation is as follows: the quantity m of sets of sampled data meets the following criteria:

$$\mathrm{erfc}\left(\frac{\lambda n}{2\overline{U}}\sqrt{\frac{m}{2}}\right) < 0.001,$$

where n represents a quantity of time stamp units included in the packet transmission interval, $\overline{U}$ represents the average value of the m estimated time stamp units, a packet transmission queuing delay from the remote device to the local device conforms to negative exponential distribution $\lambda e^{-\lambda t}$, and the erfc function is a complementary error function.

According to a second aspect, a measurement apparatus is provided, where the apparatus includes: a sampling unit, configured to obtain m sets of sampled data, where each set of sampled data includes time stamps when packets are transmitted and time points when the packets arrive at a monitoring point that are of a previously transmitted data packet and a subsequently transmitted data packet of a remote device, m is a positive integer, and m>1; a calculation unit, configured to calculate m estimated time stamp units according to the time stamps when packets are transmitted and the times of arrival at the monitoring point that are of the previously transmitted data packets and the subsequently transmitted data packets of the remote device and that are in the m sets of sampled data; and a selection unit, configured to select, from the m estimated time stamp units, an estimated time stamp unit, a difference between which and an average value of the m estimated time stamp units falls within a predetermined range, where the calculation unit is further configured to calculate a time stamp unit of the remote device according to the selected estimated time stamp unit.

With reference to the second aspect, in a first possible implementation manner, in the process of being configured to calculate the m estimated time stamp units according to the time stamps when packets are transmitted and the times of arrival at the monitoring point that are of the previously transmitted data packets and the subsequently transmitted data packets of the remote device and that are in the m sets of sampled data, the calculation unit is specifically configured to determine the m estimated time stamp units according to the following formula:

$$U_i = (S2_i - S1_i)/(t2_i - t1_i),$$

where $S1_i$ represents a packet transmission time stamp of a previously transmitted data packet of the remote device in an $i^{th}$ set of sampled data, $S2_i$ represents a packet transmission time stamp of a subsequently transmitted data packet of the remote device in the $i^{th}$ set of sampled data, $t1_i$ represents a time of arrival at the monitoring point of the previously transmitted data packet of the remote device in the $i^{th}$ set of sampled data, $t2_i$ represents a time of arrival at the monitoring point of the subsequently transmitted data packet of the remote device in the $i^{th}$ set of sampled data, and $U_i$ represents an estimated time stamp unit calculated according to the $i^{th}$ set of sampled data.

With reference to the second aspect or the first possible implementation manner of the second aspect, in the process of being configured to calculate the time stamp unit of the remote device according to the selected estimated time stamp unit, the calculation unit is specifically configured to determine the time stamp unit of the remote device according to the following formula:

$$U = \mathrm{int}(1/q(\Sigma U_i)),$$

where $\Sigma U_i$ represents a sum of the selected estimated time stamp unit, q represents a quantity of the selected estimated time stamp unit, and a function int represents rounding down.

With reference to the second aspect or the first possible implementation manner of the second aspect or the second possible implementation manner of the second aspect, in a third possible implementation manner, the selection unit is specifically configured to:

select, from the m estimated time stamp units, an estimated time stamp unit, a difference between which and the average value of the m estimated time stamp units is less than three times of a sample standard deviation of the m estimated time stamp units.

With reference to any one of the second aspect or the first possible implementation manner of the second aspect to the third possible implementation manner of the second aspect, in a fourth possible implementation manner, a specific implementation is as follows: packet lengths of any two data packets in the m sets of sampled data are equal, and packet transmission intervals of any two sets of sampled data in the m sets of sampled data are equal.

With reference to the fourth possible implementation manner of the second aspect, in a fifth possible implementation manner, a specific implementation is as follows: the packet transmission interval meets the following criteria:

$$D > 10L/B,$$

where D represents an actual time span of the packet transmission interval, L represents the packet length, and B represents a network bottleneck bandwidth between the remote device and a local device.

With reference to the fourth possible implementation manner of the second aspect or the fifth possible implementation manner of the second aspect, in a sixth possible implementation manner, a specific implementation is as follows: the quantity m of sets of sampled data meets the following criteria:

$$\mathrm{erfc}\left(\frac{\lambda n}{2\overline{U}}\sqrt{\frac{m}{2}}\right) < 0.001,$$

where n represents a quantity of time stamp units included in the packet transmission interval, $\overline{U}$ represents the average value of the m estimated time stamp units, a packet transmission queuing delay from the remote device to the local device conforms to negative exponential distribution $\lambda e^{-\lambda t}$, and the erfc function is a complementary error function.

With reference to any one of the second aspect or the first possible implementation manner of the second aspect to the sixth possible implementation manner of the second aspect, in an seventh possible implementation manner, a specific implementation is as follows: the apparatus is located on a server, or the apparatus is located on a client.

With reference to any one of the second aspect or the first possible implementation manner of the second aspect to the seventh possible implementation manner of the second aspect, in a eighth possible implementation manner, a specific implementation is as follows: the monitoring point is located on a router between the remote device and the local device, or the monitoring point is the local device.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To facilitate understanding of the embodiments of the present invention, some elements used in description of the embodiments of the present invention are first described herein.

Standard deviation (Standard Deviation): is a most commonly used measure of a statistical dispersion (statistical dispersion) in probability statistics. The standard deviation is defined as an square root of an arithmetic mean of squares of deviations of unit standard values from a mean of the unit standard values. The standard deviation reflects a degree of dispersion among objects in a set.

Population standard deviation: Assuming that a set of values is $x_1, x_2, x_3, \ldots, x_n$ (all are real numbers), and an average value (arithmetic mean) of the values is $\mu$, a population standard deviation is $$\sigma = \sqrt{\frac{1}{n}\sum_{i=1}^{n}(x_i - \mu)^2}.$$

A corresponding excel function is STDEVP.

Sample standard deviation: Assuming that a set of values is $x_1, x_2, x_3, \ldots, x_n$ (all are real numbers), and an average value (arithmetic mean) of the values is $\mu$, a sample standard deviation is $$s = \sqrt{\frac{1}{n-1}\sum_{i=1}^{n}(x_i - \mu)^2}.$$

A corresponding excel function is STDEV.

Complementary error function: is $$\mathrm{erfc}(z) = 1 - \mathrm{erf}(z) = \frac{2}{\sqrt{\pi}}\int_{z}^{\infty}e^{-t^2}dt.$$

Figure 1:
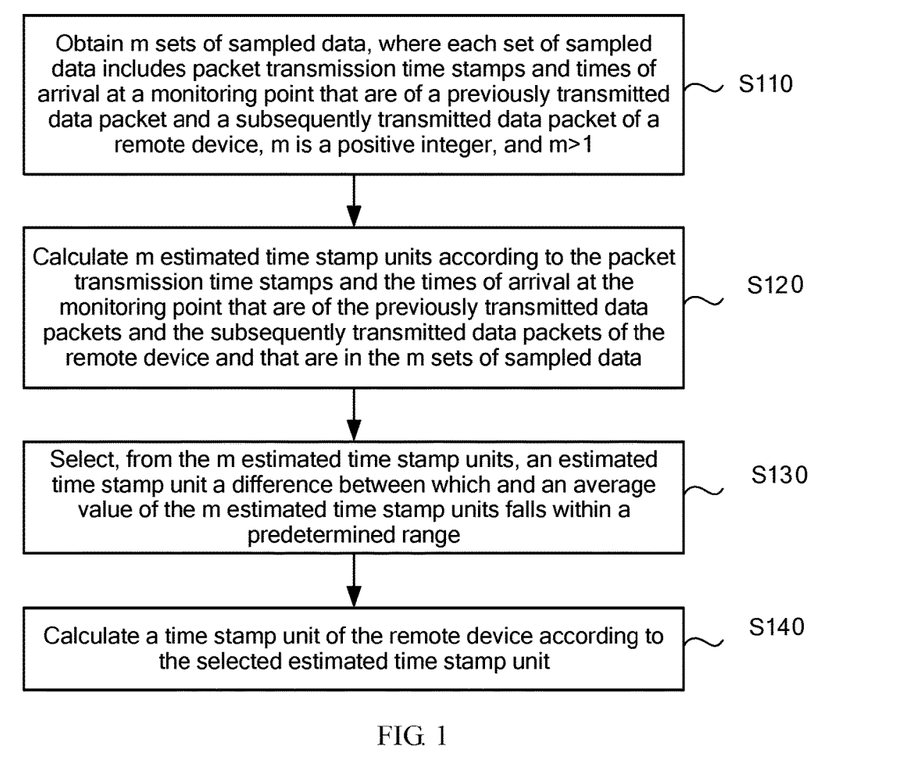
FIG. 1 is a flowchart of a method for measuring a time stamp unit of a remote device according to an embodiment of the present invention.

FIG. 1 is a flowchart of a method for measuring a time stamp unit of a remote device according to an embodiment of the present invention. The method in FIG. 1 is performed by a measurement apparatus. The measurement apparatus may be located on a server or on a client. When the measurement apparatus is located on a server, a remote end is a client; or when the measurement apparatus is located on a client, a remote end is a server.

S110. Obtain m sets of sampled data, where each set of sampled data includes time stamps when packets are transmitted and time points when the packets arrive at a monitoring point of a measurement apparatus. The packets can include a previously transmitted data packet and a subsequently transmitted data packet, both being transmitted by a remote device. M is a positive integer, and m>1.

Certainly, it should be understood that the method in this embodiment of the present invention is applicable to a scenario that includes a packet transmission time stamp.

It should be understood that a packet transmission time stamp of a data packet refers to a packet transmission time stamp for the data packet on a transmit end, and is recorded in a packet transmission time stamp field of the data packet. For example, in a TCP data packet, the packet transmission time stamp is recorded in a TCP time stamp field of the data packet.

It should be understood that the monitoring point is a measurement point specified by a local end (the measurement apparatus). The local end (the measurement apparatus) may specify a gateway device on a network path through which a remote data packet reaches the local end as the monitoring point, or specify the local end as the monitoring point.

S120. Calculate m estimated time stamp units according to the sampled time stamps when packets are transmitted and the sampled time points when the packets arrive at the monitoring point that are of the previously transmitted data packets and the subsequently transmitted data packets of the remote device and that are in the m sets of sampled data.

S130. Select, from the m estimated time stamp units, an estimated time stamp unit such that a difference between which and an average value of the m estimated time stamp units falls within a predetermined range.

S140. Calculate a time stamp unit of the remote device according to the selected estimated time stamp unit.

In this embodiment of the present invention, a unit of a remote clock is obtained by comparing a clock of a local monitoring point and a difference between time stamps of two packets, and a method for calculating an unbiased estimate by means of statistical averaging is used, to cancel an error caused by transmission delay randomicity. In this way, a relatively accurate time stamp unit can be obtained without requiring network-wide clock synchronization.

Specifically, step 120 may be implemented as: determining the m estimated time stamp units according to the following criteria:

$$U_i=(S2_i-S1_i)/(t2_i-t1_i),$$

where $S1_i$ represents a packet transmission time stamp when a previously transmitted data packet is transmitted by the remote device in an $i^{th}$ set of sampled data, $S2_i$ represents a packet transmission time stamp when a subsequently transmitted data packet is transmitted by the remote device in the $i^{th}$ set of sampled data, $t1_i$ represents a time point when the previously transmitted data packet in the $i^{th}$ set of sampled data arrives at the measuring point, $t2_i$ represents a time point when the subsequently transmitted data packet in the $i^{th}$ set of sampled data arrives at the measuring point, and $U_i$ represents an estimated time stamp unit calculated according to the $i^{th}$ set of sampled data.

Optionally, in an embodiment, step S130 may be specifically implemented as: selecting, from the m estimated time stamp units, an estimated time stamp unit, such that a difference between the selected estimated time stamp and the average value of the m estimated time stamp units is less than three times of a sample standard deviation of the m estimated time stamp units. It should be understood that, in this embodiment of the present invention, another filtering manner may be further used to remove a sample with a relatively large error. This embodiment of the present invention is merely an example.

Optionally, in an embodiment, step 140 may be specifically implemented as: determining the time stamp unit of the remote device according to the following formula:

$$U=\operatorname{int}(1/q(\Sigma U_i)),$$

where $\Sigma U_i$ represents a sum of the selected estimated time stamp unit, q represents a quantity of the selected estimated time stamp unit, and a function int represents rounding down.

It should be understood that, in this embodiment of the present invention, alternatively, another calculation manner may be used to calculate the time stamp unit of the remote device, for example, a square average value of the selected estimated time stamp unit is calculated, and then round-off is performed. This embodiment of the present invention is merely an example.

In some embodiments, packet lengths of any two data packets in the m sets of sampled data are equal, and packet transmission intervals of any two sets of sampled data in the m sets of sampled data are equal.

It should be understood that, in this embodiment of the present invention, that packet lengths of two data packets are equal does not mean that the lengths are strictly equal by mathematical meaning. When a ratio of lengths of two data packets ranges between $1\pm\delta$, the lengths of the two data packets may be considered equal, where $\delta$ is a value approximating 0, and may be set according to an actual situation. For example, $\delta$ may be set to 0.01, 0.05, or 0.1. For example, $\delta=0.01$. When a ratio of lengths of two data packets ranges from 0.99 to 1.01, the lengths of the two data packets may be considered equal.

Similarly, when a ratio of packet transmission intervals of two sets of sampled data ranges between $1\pm\varepsilon$, the packet transmission intervals of the two sets of sampled data may be considered equal, where $\varepsilon$ is a value approximating 0, and may be set according to an actual situation. For example, $\varepsilon$ may be set to 0.01, 0.05, or 0.1.

Further, the packet transmission interval meets the following criteria:

$$D \gg L/B,$$

where D represents an actual time span of the packet transmission interval, L represents the packet length, and B represents a network bottleneck bandwidth between the remote device and a local device.

Generally, a difference of one order of magnitude may be considered as being much greater than. That is, $D>10L/B$.

Still further, the quantity m of sets of sampled data meets the following criteria:

$$\operatorname{erfc}\left(\frac{\lambda n}{2\overline{U}}\sqrt{\frac{m}{2}}\right)<0.001,$$

where n represents a quantity of time stamp units included in the packet transmission interval, $\overline{U}$ represents the average value of the m estimated time stamp units, a packet transmission queuing delay from the remote device to the local device conforms to negative exponential distribution $\lambda e^{-\lambda t}$, and the erfc function is a complementary error function.

The following further describes the method in this embodiment of the present invention with reference to a specific embodiment.

Figure 2:
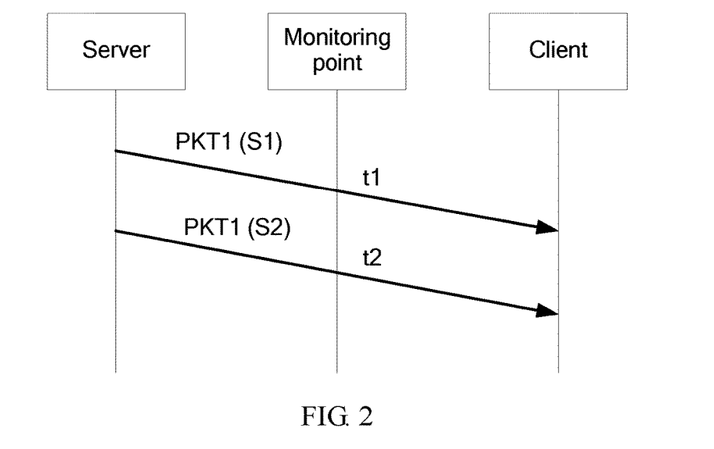
FIG. 2 is a schematic diagram of a method for estimating a remote time stamp unit according to an embodiment of the present invention.

FIG. 2 is a schematic diagram of a method for estimating a remote time stamp unit according to an embodiment of the present invention. As shown in FIG. 2, a set of sampled data obtained by a client includes time stamps when packets are transmitted and time points when the packets arrive at a monitoring point of two data packets. A data packet sent first may be referred to as a previously transmitted data packet (PKT1 in FIG. 2), and a data packet sent subsequently may be referred to as a subsequently transmitted data packet (PKT2 in FIG. 2). In this case, a set of sampled data that the client needs to obtain includes a packet transmission time stamp count (referred to as a packet transmission time stamp) S1 of PKT1, a time t1 of arrival at the monitoring point of PKT1, a packet transmission time stamp count S2 of PKT2, and a time t2 of arrival at the monitoring point of PKT2. Both t1 and t2 are clocks of the monitoring point.

If transmission times of two packets are the same, a time interval between the two packets at the monitoring point remains unchanged. A time stamp unit may be directly measured at the monitoring point. That is, the time stamp unit $U=(S2-S1)/(t2-t1)$. However, transmission times of two packets change randomly. As a result, a packet interval observed at the monitoring point and a packet transmission interval are different.

A measurement manner in this embodiment of the present invention is as follows:

S1. Perform measurement for m times to obtain m sets of sampled data.

Sampled data obtained during an $i^{th}$ time of measurement includes a packet transmission time stamp $S1_i$ and a time $t1_i$ of arrival at a monitoring point of a previously transmitted data packet and a packet transmission time stamp $S2_i$ and a time $t2_i$ of arrival at the monitoring point of a subsequently transmitted data packet.

A time stamp unit $U_i$ during the $i^{th}$ time of measurement may be obtained through calculation: $U_i=(S2_i-S1_1)/(t2_i-t1_i)$.

S2. Calculate an average value: $\overline{U}=1/m(\Sigma U_i)$.

S3. Select a time stamp unit measurement value a difference between which and the average value $\overline{U}$ falls within a predetermined range.

For example, a time stamp unit measurement value a difference between which and $\overline{U}$ is between ±5% may be selected.

For another example, according to a statistics method, a sample value greater than three times of a sample standard deviation is an abnormal error and should be discarded. In this case, a measured sample standard deviation S may be calculated:

$$s = \sqrt{\frac{1}{m-1}\sum_{i=1}^{m}(U_i-\overline{U})^2}.$$

A time stamp unit measurement value that meets a condition $-3s \leq U_i - \overline{U} \leq 3s$ is selected according to the sample standard deviation S. It is assumed that q time stamp unit measurement values are selected.

S4. Calculate an average time stamp unit again: $\overline{U}=1/q(\Sigma U_i)$.

S5. Round U to obtain an integer: $\hat{U}=\text{int}(\overline{U})$.

In this case, $\hat{U}$ is a calculated time stamp unit.

Certainly, if improper sampled data is selected, a relatively large measurement error is caused.

For example, if packet lengths of the previously transmitted data packet and the subsequently transmitted data packet are different, transmission times of the previous and subsequent packets are subsequently different, and a difference between a packet interval measured at the monitoring point and a packet interval at a packet transmission position is relatively large. As a result, a difference between a time stamp unit obtained according to the sampled data and an actual time stamp unit is relatively large.

In addition, if packet lengths or packet intervals in different sets of sampled data are different, accuracy of a time stamp unit calculated according to the sampled data is also reduced consequently.

Therefore, during selection of sampled data, it should be ensured, as far as possible, that packet lengths of data packets (including previously transmitted data packets and subsequently transmitted data packets) in all sampled data are equal, so that packet intervals of all the sampled data are equal.

In addition, if a packet interval is too small, a packet interval measured at the monitoring point may become larger due to network bandwidth restriction. Alternatively, because of a traffic change during network transmission, even if there is sufficient bandwidth, a packet interval measured at the monitoring point may become larger due to a packet interval inserted by another contention traffic packet.

Therefore, in terms of packet interval selection, it should be ensured, as far as possible, that a length D (in a unit of millisecond) of a packet interval is much greater than a value obtained by dividing a packet length L (in a unit of B) by a network bottleneck bandwidth B (in a unit of kB/s). That is, $D \gg L/B$. Generally, $D > 10\ L/B$.

In addition, in the method for calculating a remote time stamp unit in this embodiment of the present invention, accuracy is also closely related to a quantity of samples and a packet interval.

The following uses an example to describe how to select a packet interval n (in a time stamp unit of tick) and a measure sample data m to ensure accuracy of an obtained time stamp unit (tick).

It is assumed that a tick of a time stamp on a transmit end is equal to k milliseconds, and a packet interval between previous and subsequent packets before packet transmission is D. It is assumed that a queuing delay of a transmission path conforms to negative exponential distribution $\lambda e^{-\lambda t}$, where $\lambda > 0$, and $\lambda$ is a parameter of exponential distribution and is usually referred to as a rate parameter (rate parameter), that is, a quantity of times the event occurs in each unit time. An average value of the distribution is equal to $1/\lambda$, and a variance of the distribution is equal to $1/\lambda^2$. For example, assuming that, on average, there are five packets waiting for transmission in front of a packet being studied, $1/\lambda=5\times \text{MSS}/\text{Bandwidth}$, where MSS represents a length of the data packets, and the bandwidth is a bottleneck bandwidth of network transmission. Distribution of a packet interval (t2−t1) between a previously transmitted data packet and a subsequently transmitted data packet at a measurement point is $$D + \frac{\lambda}{2}e^{-\lambda|t|},$$

where t represents a queuing delay. An average value of the distribution is equal to D, and a variance of the distribution is equal to $2/\lambda^2$.

At the measurement point, an unbiased estimate of a time stamp unit U may be performed by using m sample values:

In a first step, obtain sample values U: $U_i=(t2-t1)/(S2-S1)$.

Average value of $U_i=k$ milliseconds. Variance=$2/\lambda^2/n^2$.

In a second step, calculate an average value of m measurements, where an average value $\overline{U}$ is equal to k, and a variance is $2/\lambda^2/(mn^2)$.

Distribution of $\overline{U}$ may approximate to normal distribution $\text{Norma}\{k,[2/\lambda^2/(mn^2)]^{1/2}\}$. An error probability of the normal distribution may be calculated according to an error function $$\text{erf}(z) = 1 - \frac{2}{\sqrt{\pi}}\int_z^\infty e^{-t^2}dt.$$

To ensure that rounded $\hat{U}$ is equal to k milliseconds, it needs to ensure that an error is less than 0.5 k. In this case, values of n and m may be selected, to ensure that $$\text{erfc}\left(\frac{\lambda n}{2k}\sqrt{\frac{m}{2}}\right) < 0.001,$$

so that $\hat{U} \neq k$ becomes a small probability event.

$$\mathrm{erfc}(z) = 1 - \mathrm{erf}(z) = \frac{2}{\sqrt{\pi}} \int_{z}^{\infty} e^{-t^2} dt$$

is referred to as a complementary error function, and a value of the function may be obtained by querying a common mathematical table or a common project table.

In an example, it is assumed that k=10 milliseconds, MSS=1500 bytes, transmission bandwidth=100 Mbit/s, and 1/λ=0.6 milliseconds. It is obtained, by querying a complementary error table, that a value of $$x = \frac{\lambda n}{2k} \sqrt{\frac{m}{2}}$$

corresponding to a value that is of $$\mathrm{erfc}\left(\frac{\lambda n}{2k} \sqrt{\frac{m}{2}}\right)$$

and that is less than 0.001 is equal to 2.33, that is, $n\sqrt{m}$=4.66 $\sqrt{2}$×10×0.6≈40.

It may be assumed that m=25 and n=8. That is, accuracy of a time unit may be basically ensured when calculation is performed based on only samples with a packet interval greater than 80 milliseconds. Alternatively, it is assumed that m=36 and n=7. That is, calculation is performed based on only samples with a packet interval greater than 70 milliseconds. If n=2, m needs to be greater than or equal to 400.

Figure 3:
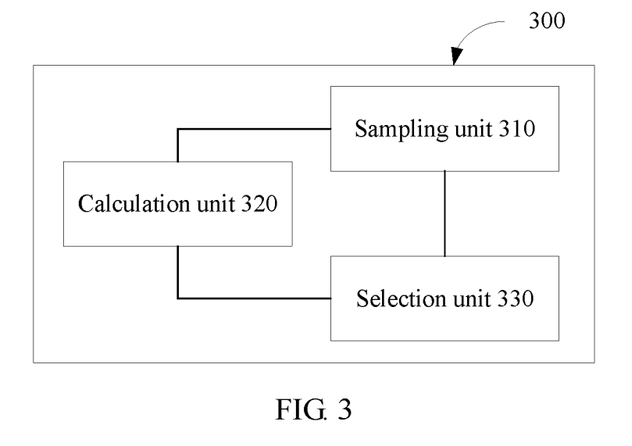
FIG. 3 is a schematic structural diagram of a measurement apparatus according to an embodiment of the present invention.

FIG. 3 is a schematic structural diagram of a measurement apparatus 300 according to an embodiment of the present invention. The measurement apparatus 300 may be located on a server or may be located on a client. As shown in FIG. 3, the measurement apparatus 300 may include:

a sampling unit 310, configured to obtain m sets of sampled data, where each set of sampled data includes time stamps when packets are transmitted and time points when the packets arrive at a monitoring point, the packets including a previously transmitted data packet and a subsequently transmitted data packet of a remote device, and m being a positive integer, and m>1;

a calculation unit 320, configured to calculate m estimated time stamp units according to the sampled time stamps when packets are transmitted and the sampled time points when the packets arrive at the measuring point; and a selection unit 330, configured to select, from the m estimated time stamp units, an estimated time stamp unit, such that a difference between the selected estimated time stamp and an average value of the m estimated time stamp units falls within a predetermined range.

The calculation unit 320 is further configured to calculate a time stamp unit of the remote device according to the selected estimated time stamp unit.

In this embodiment of the present invention, the measurement apparatus 300 obtains a unit of a remote clock by comparing a clock of a local monitoring point and a difference between time stamps of two packets, and uses a method for calculating an unbiased estimate by means of statistical averaging, to cancel an error caused by transmission delay randomicity. In this way, a relatively accurate time stamp unit can be obtained without requiring network-wide clock synchronization.

Specifically, calculating m estimated time stamp units according to the sampled time stamps when packets are transmitted and sampled time points when the packets arrive at a monitoring point comprises: determining the m estimated time stamp units according to the following formula:

$$U_i = (S2_i - S1_i)/(t2_i - t1_i),$$

where $S1_i$ represents a time stamp when a previously transmitted data packet by the remote device in an $i^{th}$ set of sampled data, $S2_i$ represents a time stamp when a subsequently transmitted data packet by the remote device in the $i^{th}$ set of sampled data, $t1_i$ represents a time point when the previously transmitted data packet in the $i^{th}$ set of sampled data arrives at the monitoring point, $t2_i$ represents a time point when the subsequently transmitted data packet in the $i^{th}$ set of sampled data arrives at the monitoring point, and $U_i$ represents an estimated time stamp unit calculated according to the $i^{th}$ set of sampled data.

Optionally, in an embodiment, the selection unit 330 may be specifically configured to: select, from the m estimated time stamp units, an estimated time stamp unit, a difference between which and the average value of the m estimated time stamp units is less than three times of a sample standard deviation of the m estimated time stamp units. The sample standard deviation is a sample standard deviation of the m estimated time stamp units. It should be understood that, in this embodiment of the present invention, another filtering manner may be further used to remove a sample with a relatively large error. This embodiment of the present invention is merely an example.

Optionally, in an embodiment, in the process of being configured to calculate the time stamp unit of the remote device according to the selected estimated time stamp unit, the calculation unit 320 is specifically configured to determine the time stamp unit of the remote device according to the following formula:

$$U = \mathrm{int}(1/q(\Sigma U_i)),$$

where $\Sigma U_i$ represents a sum of the selected estimated time stamp unit, q represents a quantity of the selected estimated time stamp unit, and a function int represents rounding down.

It should be understood that, in this embodiment of the present invention, alternatively, another calculation manner may be used to calculate the time stamp unit of the remote device, for example, a square average value of the selected estimated time stamp unit is calculated, and then round-off is performed. This embodiment of the present invention is merely an example.

Preferably, packet lengths of any two data packets in the m sets of sampled data are equal, and packet transmission intervals of any two sets of sampled data in the m sets of sampled data are equal.

Further, the packet transmission interval meets the following criteria:

$$D \gg L/B,$$

where D represents an actual time span of the packet transmission interval, L represents the packet length, and B represents a network bottleneck bandwidth between the remote device and a local device.

Generally, a difference of one order of magnitude may be considered as being much greater than. That is, D>10L/B.

Still further, the quantity m of sets of sampled data meets the following criteria:

$$\mathrm{erfc}\left(\frac{\lambda n}{2\overline{U}}\sqrt{\frac{m}{2}}\right)<0.001,$$

where n represents a quantity of time stamp units included in the packet transmission interval, $\overline{U}$ represents the average value of the m estimated time stamp units, a packet transmission queuing delay from the remote device to the local device conforms to negative exponential distribution $\lambda e^{-\lambda t}$, and the erfc function is a complementary error function.

Optionally, the measurement apparatus 300 may be located on a server or on a client.

Optionally, the monitoring point is located on a router between the remote device and the local device, or the monitoring point is the local device.

Figure 4:
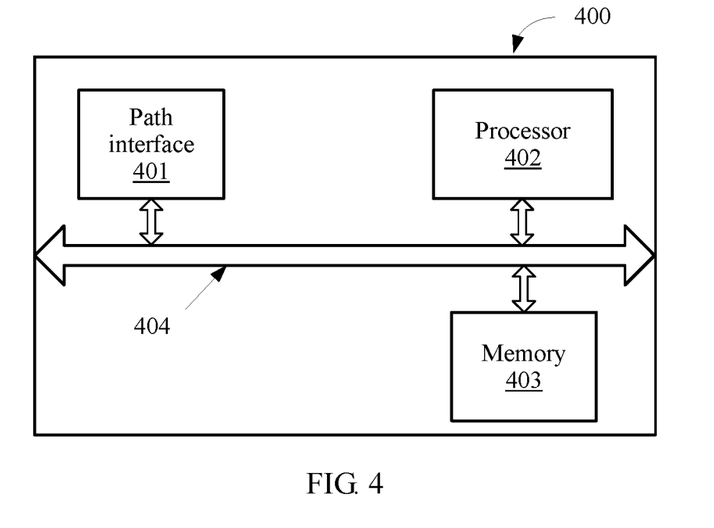
FIG. 4 is another schematic structural diagram of a measurement apparatus according to an embodiment of the present invention.

FIG. 4 is a schematic structural diagram of a measurement apparatus 400 according to an embodiment of the present invention. The measurement apparatus 400 may include a path interface 401, a processor 402, and a memory 403.

The path interface 401, the processor 402, and the memory 403 are mutually connected by using a bus 404 system. The bus 404 may be an ISA bus, a PCI bus, an EISA bus, or the like. The bus may be classified into an address bus, a data bus, a control bus, and the like. For ease of representation, in FIG. 4, only a line with an arrow on both sides is used to represent the bus, but this does not mean that there is only one bus or one type of bus.

The memory 403 is configured to store a program. Specifically, the program may include program code, and the program code includes a computer operation instruction. The memory 403 may include a read-only memory and a random access memory, and provide an instruction and data to the processor 402. The memory 403 may include a high-speed RAM, and may further include a non-volatile memory (non-volatile memory), for example, at least one magnetic disk memory.

The processor 402 executes the program stored in the memory 403, and is specifically configured to perform the following operations:

obtaining m sets of sampled data, wherein each set of sampled data comprises time stamps when packets are transmitted by a remote device and time points when the packets arrive at a monitoring point, the packets including a previously transmitted data packet and a subsequently transmitted data packet, the subsequently transmitted data packet being transmitted by the remote device subsequently to the previously transmitted data packet, wherein m is a positive integer, and m>1; and calculating m estimated time stamp units according to the m sets of sampled data; selecting, from the m estimated time stamp units, a time stamp unit, such that a difference between the selected estimated time stamp and an average value of the m estimated time stamp units is within a predetermined range; and calculating an average value of the selected estimated time stamp unit and round the calculated average value to obtain an integer, to obtain an unbiased estimated time stamp unit.

The foregoing method that is executed by a measurement apparatus and that is disclosed in either of the embodiments in FIG. 1 and FIG. 2 of the present invention may be applied to the processor 402 or implemented by the processor 402. The processor 402 may an integrated circuit chip having a signal processing capability. In an implementation process, the steps of the foregoing method may be completed by using a hardware integrated logic circuit or an instruction in a form of software in the processor 402. The foregoing processor 402 may be a general-purpose processor, including a central processing unit (Central Processing Unit, CPU for short), a network processor (Network Processor, NP for short), or the like, or may be a digital signal processor (DSP), an application-specific integrated circuit (ASIC), a field programmable gate array (FPGA) or another programmable logical device, a discrete gate or a transistor logic device, or a discrete hardware component. The processor may implement or perform the methods, steps, and logical block diagrams disclosed in the embodiments of the present invention. The general-purpose processor may be a micro processor, or the processor may be any conventional processor or the like. The steps of the method disclosed with reference to the embodiments of the present invention may be directly embodied as being performed and completed by a hardware decoding processor, or being performed and completed by a combination of hardware and software modules in the decoding processor. The software module may be located in a mature storage medium in the art, such as a random memory, a flash memory, a read-only memory, a programmable read-only memory or an electrically erasable programmable memory, or a register. The storage medium is located in the memory 403, and the processor 402 reads information in the memory 403 and completes the steps of the foregoing method in combination with hardware of the processor 402.

In this embodiment of the present invention, the measurement apparatus 400 obtains a unit of a remote clock by comparing a clock of a local monitoring point and a difference between time stamps of two packets, and uses a method for calculating an unbiased estimate by means of statistical averaging, to cancel an error caused by transmission delay randomicity. In this way, a relatively accurate time stamp unit can be obtained without requiring network-wide clock synchronization.

Specifically, in the process of being configured to calculate the m estimated time stamp units according to the time stamps when packets are transmitted and the times of arrival at the monitoring point that are of the previously transmitted data packets and the subsequently transmitted data packets of the remote device and that are in the m sets of sampled data, the processor 402 may be configured to determine the m estimated time stamp units according to the following formula:

$$U_i=(S2_i-S1_i)/(t2_i-t1_i),$$

where $S1_i$ represents a time stamp when a previously transmitted data packet by the remote device in an $i^{th}$ set of sampled data, $S2_i$ represents a time stamp when a subsequently transmitted data packet by the remote device in the $i^{th}$ set of sampled data, $t1_i$ represents a time point when the previously transmitted data packet in the $i^{th}$ set of sampled data arrives at the monitoring point, $t2_i$ represents a time point when the subsequently transmitted data packet in the $i^{th}$ set of sampled data arrives at the monitoring point, and $U_i$ represents an estimated time stamp unit calculated according to the $i^{th}$ set of sampled data.

Optionally, in an embodiment, in the process of being configured to select, from the m estimated time stamp units, the estimated time stamp unit, a difference between which and the average value of the m estimated time stamp units falls within the predetermined range, the processor 402 may be specifically configured to: select, from the m estimated time stamp units, an estimated time stamp unit, a difference between which and the average value of the m estimated time stamp units is less than three times of a sample standard deviation of the m estimated time stamp units. It should be understood that, in this embodiment of the present invention, another filtering manner may be further used to remove a sample with a relatively large error. This embodiment of the present invention is merely an example.

Optionally, in an embodiment, in the process of being configured to calculate the time stamp unit of the remote device according to the selected estimated time stamp unit, the processor 402 is specifically configured to determine the time stamp unit of the remote device according to the following formula:

$$U=\text{int}(1/q(\Sigma U_i)),$$

where $\Sigma U_i$ represents a sum of the selected estimated time stamp unit, q represents a quantity of the selected estimated time stamp unit, and a function int represents rounding down.

It should be understood that, in this embodiment of the present invention, alternatively, another calculation manner may be used to calculate the time stamp unit of the remote device, for example, a square average value of the selected estimated time stamp unit is calculated, and then round-off is performed. This embodiment of the present invention is merely an example.

Preferably, packet lengths of any two data packets in the m sets of sampled data are equal, and packet transmission intervals of any two sets of sampled data in the m sets of sampled data are equal.

Further, the packet transmission interval meets the following criteria:

$$D \gg L/B,$$

where D represents an actual time span of the packet transmission interval, L represents the packet length, and B represents a network bottleneck bandwidth between the remote device and a local device.

Generally, a difference of one order of magnitude may be considered as being much greater than. That is, $D>10L/B$.

Still further, the quantity m of sets of sampled data meets the following criteria:

$$\text{erfc}\left(\frac{\lambda n}{2\overline{U}}\sqrt{\frac{m}{2}}\right) < 0.001,$$

where n represents a quantity of time stamp units included in the packet transmission interval, $\overline{U}$ represents the average value of the m estimated time stamp units, a packet transmission queuing delay from the remote device to the local device conforms to negative exponential distribution $\lambda e^{-\lambda t}$, and the erfc function is a complementary error function.

Optionally, the measurement apparatus 400 may be located on a server or on a client.

Optionally, the monitoring point is located on a router between the remote device and the local device, or the monitoring point is the local device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit, and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for measuring a time stamp unit of a remote device, comprising:
 obtaining m sets of sampled data, wherein each set of the sampled data comprises time stamps corresponding to packets and indicating when the packets are transmitted by the remote device and time points indicating when the packets arrive at a monitoring point, wherein m is a positive integer, and m>1, and wherein the sampled data includes:
- a first time stamp corresponding to a first packet, the first time stamp indicating when the first packet is transmitted by the remote device;
- a second time stamp corresponding to a second packet, the second time stamp indicating when the second packet is transmitted by the remote device, and the second time stamp is later than the first time stamp;
- a first time point corresponding to the first packet, the first time point indicating when the first packet arrives at the monitoring point; and
- a second point corresponding to the second packet, the second time point indicating when the second packet arrives at the monitoring point;

calculating m estimated time stamp units according to the m sets of the sampled time stamps when the packets are transmitted and sampled time points when the packets arrive at the monitoring point;

selecting, from the m estimated time stamp units, one or more estimated time stamp units by virtue of a difference between each of the one or more selected estimated time stamp units and an average value of the m estimated time stamp units is within a predetermined range; and calculating the time stamp unit of the remote device according to the one or more selected estimated time stamp units.

2. The method according to claim 1, wherein calculating m estimated time stamp units according to the m sets of sampled time stamps when packets are transmitted and sampled time points when the packets arrive at the monitoring point comprises:
determining the m estimated time stamp units according to the following formula:

$$U_i = (S2_i - S1_i)/(t2_i - t1_i),$$

wherein $S1_i$ represents a time stamp when a previously transmitted data packet by the remote device in an $i^{th}$ set of sampled data, $S2_i$ represents a time stamp when a subsequently transmitted data packet by the remote device in the $i^{th}$ set of sampled data, $t1_i$ represents a time point when the previously transmitted data packet in the $i^{th}$ set of sampled data arrives at the monitoring point, $t2_i$ represents a time point when the subsequently transmitted data packet in the $i^{th}$ set of sampled data arrives at the monitoring point, and $U_i$ represents an estimated time stamp unit calculated according to the $i^{th}$ set of sampled data.

3. The method according to claim 1, wherein calculating the time stamp unit of the remote device according to the selected estimated time stamp unit comprises:
determining the time stamp unit of the remote device according to the following formula:

$$U = \text{int}(1/q(\Sigma U_i)),$$

wherein $\Sigma U_i$ represents a sum of the one or more selected estimated time stamp units, q represents a quantity of the selected estimated time stamp unit, and int represents a rounding down function.

4. The method according to claim 1, wherein, the selected one or more time stamp units include a first estimated time stamp unit and, wherein
selecting, from the m estimated time stamp units, the one or more estimated time stamp units such that a difference between each of the selected one or more estimated time stamps and an average value of the m estimated time stamp units is within a predetermined range comprises:
selecting, from the m estimated time stamp units, the first estimated time stamp unit by virtue of a difference between the first estimated time stamp unit and the average value of the m estimated time stamp units is less than three times of a sample standard deviation of the m estimated time stamp units.

5. The method according to claim 1, wherein packet lengths of any two packets in the m sets of sampled data are equal, and packet transmission intervals of any two sets of sampled data in the m sets of sampled data are equal.

6. The method according to claim 5, wherein the packet transmission interval meets the following criteria:

$$D > 10L/B,$$

wherein D represents an actual time span of the packet transmission interval, L represents the packet length, and B represents a network bottleneck bandwidth between the remote device and a local device.

7. The method according to claim 5, wherein the quantity m of sets of sampled data meets the following criteria:

$$\text{erfc}\left(\frac{\lambda n}{2\overline{U}}\sqrt{\frac{m}{2}}\right) < 0.001,$$

wherein n represents a quantity of time stamp units comprised in the packet transmission interval, $\overline{U}$ represents the average value of the m estimated time stamp units, a packet transmission queuing delay from the remote device to a local device conforms to negative exponential distribution $\lambda e^{-\lambda t}$, and the erfc function is a complementary error function.

8. A measurement apparatus, comprising: a memory, and a processor; wherein the memory is configured to store a program used by the processor to perform media content rendering:
the processor is configured to obtain m sets of sampled data, wherein each set of the sampled data comprises time stamps corresponding to packets and indicating when the packets are transmitted by a remote device and time points indicating when the packets arrive at a monitoring point, wherein m is a positive integer, and m>1, and wherein the sample data includes:
- a first time stamp corresponding to a first packet, the first time stamp indicating a time point when the first packet is transmitted by the remote device;
- a second time stamp corresponding to a second packet, the second time stamp indicating a time point when the second packet is transmitted by the remote device, and the second time stamp is later than the first time stamp;
- a first time point corresponding to the first packet, the first time point indicating when the first packet arrives at the monitoring point; and
- a second point corresponding to the second packet, the second time point indicating when the second packet arrives at the monitoring point;

calculate m estimated time stamp units according to the m sets of the sampled time stamps when the packets are transmitted and sampled time points when the packets arrive at the monitoring point;

select, from the m estimated time stamp units, one or more estimated time stamp units by virtue of a difference between each of the one or more selected estimated time stamp units and an average value of the m estimated time stamp units is within a predetermined range; and calculate a time stamp unit of the remote device according to the one or more selected estimated time stamp units.

9. The apparatus according to claim 8, wherein calculating m estimated time stamp units according to the m sets of sampled time stamps when packets are transmitted and sampled time points when the packets arrive at the monitoring point comprises:

determine the m estimated time stamp units according to the following formula:

$$U_i=(S2_i-S1_i)/(t2_i-t1_i),$$

wherein $S1_i$ represents a time stamp when a previously transmitted data packet by the remote device in an $i^{th}$ set of sampled data, $S2_i$ represents a time stamp when a subsequently transmitted data packet by the remote device in the $i^{th}$ set of sampled data, $t1_i$ represents a time point when the previously transmitted data packet in the $i^{th}$ set of sampled data arrives at the monitoring point, $t2_i$ represents a time point when the subsequently transmitted data packet in the $i^{th}$ set of sampled data arrives at the monitoring point, and $U_i$ represents an estimated time stamp unit calculated according to the $i^{th}$ set of sampled data.

10. The apparatus according to claim 8, wherein: in the process of being configured to calculate the time stamp unit of the remote device according to the selected estimated time stamp unit, the processor is configured to determine the time stamp unit of the remote device according to the following formula:

$$U=\text{int}(1/q(\Sigma U_i)),$$

wherein $\Sigma U$ represents a sum of the one or more selected estimated time stamp units, q represents a quantity of the selected estimated time stamp unit, and int represents a rounding down function.

11. The apparatus according to claim 8, wherein the selected one or more time stamp units include a first estimated time stamp unit and, wherein selecting, the one or more estimated time stamp units such that a difference between each of the selected one or more estimated time stamps and an average value of the m estimated time stamp units is within a predetermined range comprises:

selecting, from the m estimated time stamp units, the first estimated time stamp unit by virtue of a difference between the first estimated time stamp unit and the average value of the m estimated time stamp units is less than three times of a sample standard deviation of the m estimated time stamp units.

12. The apparatus according to claim 8, wherein packet lengths of any two packets in the m sets of sampled data are equal, and packet transmission intervals of any two sets of sampled data in the m sets of sampled data are equal.

13. The apparatus according to claim 12, wherein the packet transmission interval meets the following criteria:

$$D>10L/B,$$

wherein D represents an actual time span of the packet transmission interval, L represents the packet length, and B represents a network bottleneck bandwidth between the remote device and a local device on which the apparatus is located.

14. The apparatus according to claim 8, wherein the apparatus is located on a server, or the apparatus is located on a client.

15. The apparatus according to claim 8, wherein the monitoring point is located on a router between the remote device and a local device, or the monitoring point is the local device.

16. A non-transitory computer-readable storage medium comprising instructions which, when executed by a computer, cause the computer to carry out the method comprises:

obtaining m sets of sampled data, wherein each set of the sampled data comprises time stamps corresponding to packets and indicating when the packets are transmitted by a remote device and time points indicating when the packets arrive at a monitoring point, wherein m is a positive integer, and m>1, and wherein the sampled data includes:

a first time stamp corresponding to a first packet, the first time stamp indicating a time point when the first packet is transmitted by the remote device;

a second time stamp corresponding to a second packet, the second time stamp indicating a time point when the second packet is transmitted by the remote device, and the second time stamp is later than the first time stamp;

a third time stamp corresponding to the first packet, the third time stamp indicating a time point when the first packet arrives at the monitoring point; and a fourth time stamp corresponding to the second packet, the fourth time stamp indicating a time point when the second packet arrives at the monitoring point;

calculating m estimated time stamp units according to the m sets of the sampled time stamps when the packets are transmitted and sampled time points when the packets arrive at the monitoring point;

selecting, from the m estimated time stamp units, one or more estimated time stamp units by virtue of a difference between each of the one or more selected estimated time stamp units and an average value of the m estimated time stamp units is within a predetermined range; and calculating the time stamp unit of the remote device according to the one or more selected estimated time stamp units.

17. The computer-readable storage medium according to claim 16, wherein calculating m estimated time stamp units according to the m sets of sampled time stamps when packets are transmitted and sampled time points when the packets arrive at the monitoring point comprises:

determining the m estimated time stamp units according to the following formula:

$$U_i=(S2_i-S1_i)/(t2_i-t1_i),$$

wherein $S1_i$ represents a time stamp when a previously transmitted data packet by the remote device in an $i^{th}$ set of sampled data, $S2_i$ represents a time stamp when a subsequently transmitted data packet by the remote device in the $i^{th}$ set of sampled data, $t1_i$ represents a time point when the previously transmitted data packet in the $i^{th}$ set of sampled data arrives at the monitoring point, $t2_i$ represents a time point when the subsequently transmitted data packet in the $i^{th}$ set of sampled data arrives at the monitoring point, and $U_i$ represents an estimated time stamp unit calculated according to the $i^{th}$ set of sampled data.

18. The computer-readable storage medium according to claim 16, wherein calculating the time stamp unit of the remote device according to the selected estimated time stamp unit comprises:

determining the time stamp unit of the remote device according to the following formula:

$$U=\text{int}(1/q(\Sigma U_i)),$$

wherein $\Sigma U_i$ represents a sum of the one or more selected estimated time stamp units, q represents a quantity of the selected estimated time stamp unit, and int represents a rounding down function.

19. The computer-readable storage medium according to claim 16, wherein, wherein, the selected one or more time stamp units include a first estimated time stamp unit and, wherein selecting, from the m estimated time stamp units, the one or more estimated time stamp units such that a difference between each of the selected one or more estimated time stamps and an average value of the m estimated time stamp units is within a predetermined range comprises:

selecting, from the m estimated time stamp units, the first estimated time stamp unit by virtue of a difference between the first estimated time stamp unit and the average value of the m estimated time stamp units is less than three times of a sample standard deviation of the m estimated time stamp units.

20. The computer-readable storage medium according to claim 16, wherein packet lengths of any two packets in the m sets of sampled data are equal, and packet transmission intervals of any two sets of sampled data in the m sets of sampled data are equal.

* * * * *